United States Patent [19]
La Force

[11] 3,820,270
[45] June 28, 1974

[54] SEMI-BUOYANT SINKER

[76] Inventor: Robert C. La Force, 514 W. View Dr., Beaver, Pa. 15009

[22] Filed: Nov. 21, 1972

[21] Appl. No.: 308,413

[52] U.S. Cl. ............................................. 43/43.14
[51] Int. Cl. ..................... A01k 93/00, A01k 95/00
[58] Field of Search ................................. 43/43.14

[56] References Cited
UNITED STATES PATENTS

| | | |
|---|---|---|
| 2,519,427 | 8/1950 | Besmer ............................ 43/43.14 |
| 2,986,839 | 6/1961 | Crimble ........................... 43/43.14 |
| 3,012,359 | 12/1961 | Foster .............................. 43/43.14 |
| 3,337,981 | 8/1967 | Bowman .......................... 43/43.14 |
| 3,670,447 | 6/1972 | Wohead ........................... 43/43.14 |
| 3,736,690 | 6/1973 | Witkowski ....................... 43/43.14 |

Primary Examiner—Warner H. Camp
Attorney, Agent, or Firm—Thomas G. Miller

[57] ABSTRACT

A fishing sinker is provided having the properties of heaviness in air and of lightness or of a desired buoyancy in water. The sinker may be used either on an attached auxiliary line or on a fishing line or leader between a pole and the hook or lure. It basically has a weight that is sufficient for casting the lure a desired distance and a sealed-off fluid or air space that gives it a suitable buoyancy when it strikes the water. It may be constructed for a variation of its buoyancy and for a change in its center of gravity within the water.

7 Claims, 13 Drawing Figures

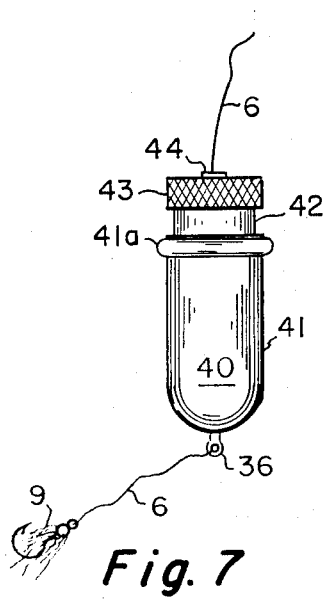
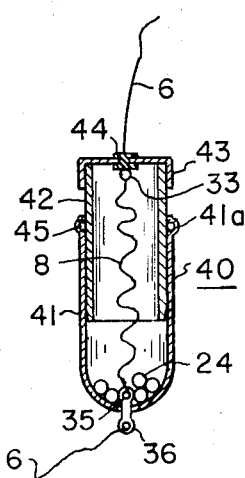
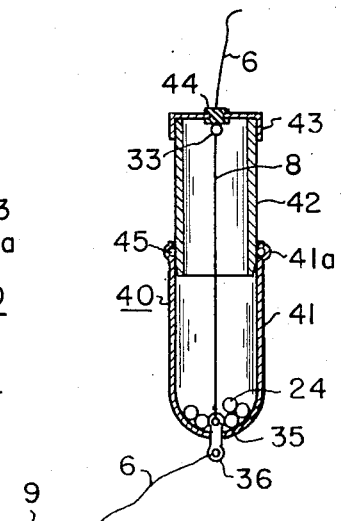
Fig. 7  Fig. 8  Fig. 9
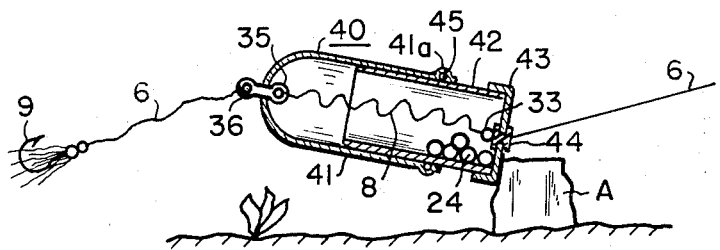
Fig. 10
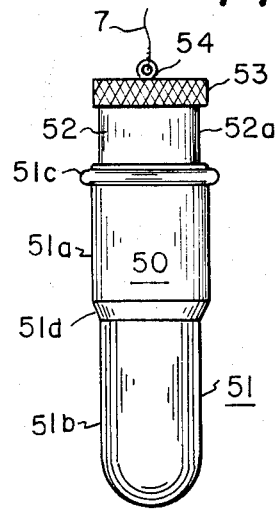
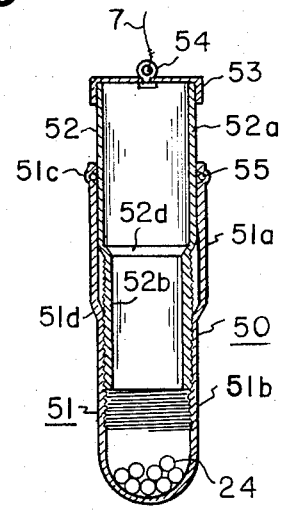
Fig. 11  Fig. 12

SEMI-BUOYANT SINKER

BACKGROUND OF THE INVENTION

1. Field of the Invention

This invention relates to a fishing sinker that will meet weight requirements for throwing or casting and that, at the same time, will have improved operating characteristics in the water.

2. Description of the Prior Art

Heretofore, it has been customary to make fishing sinkers of solid lead or lead alloy and to use a weight that enables the fishing line and particularly the lure to be cast or thrown to a desired location in the stream or body of water. It has been determined that such a type of sinker has little difference in weight in the water as compared in the air.

It has been customary to use a lightweight or small sinker for casting off-shore. The disadvantage of using a heavier sinker has been the tendency for it to drag the bottom of the stream or body of water and to catch on stones and other obstructions; this is particularly true of a sinker weighing, for example, ⅝ of an ounce or greater. However, with a light sinker it is not possible to get desired distances in casting. That is, the present day fisherman has a choice of installing a lightweight sinker on his line if he desires a high degree of sensitivity or of installing a heavier sinker if he wishes to obtain a longer casting range. Thus, there is the penalty of a poor casting range for a lightweight sinker and of a loss of sensitivity for a heavier sinker and its tendency to drag the bottom and snag and, particularly, when the lure is being retrieved or when a fish is on the line.

A commercial lead sinker having a weight of about 11.342 grams in air has a weight in water of about 10.342 grams which is only about 8.8 percent less than that in air. Such a sinker also displaces about one c.c. of water which weighs about one gram, with the result that the buoyant action of the water on the lead sinker is only about one gram and thus of little effectiveness.

Conventional sinkers are usually of equal density throughout and tend to rest flat at the bottom of a body of water due to the fact that the center of gravity and the center of buoyancy are one and the same. There is a general lack of stability which causes the sinker to tumble and roll, to drag the fishing line into a muddy bottom or between stones and other obstructions, and cause the line or sinker to snag and resist retrieving.

SUMMARY OF THE INVENTION

It has thus been an object of the present invention to solve the problem presented by the use of conventional sinkers and to devise a new form that will have an appreciable buoyancy part of its weight counterbuoyed in water.

A further object has been to develop a sinker that can be provided with any desired effective weight in air for casting and that, at the same time, will have any desired minimized weight in water.

A further object of the invention has been to devise a fishing sinker that in use will mitigate against difficulties heretofore encountered from the standpoint of effectively obtaining a broad range of maximum to minimum distance and accuracy of casting without giving rise to adverse factors such as those previously encountered.

These and other objects of the invention will appear to those skilled in the art from the illustrated embodiments and the claims.

BRIEF DESCRIPTION OF THE DRAWINGS

In the drawings.

FIG. 7 is a vertical view in elevation on the scale of FIGS. 1, 3 and 6 illustrating a further adjustable embodiment of the invention.

FIG. 8 is a vertical section on the scale of FIG. 7 showing parts of the construction in their innermost relationship of FIG. 7.

FIG. 9 is a vertical section on the scale of FIGS. 7 and 8 showing parts of the device in an extended relation.

FIG. 10 is a vertical view in elevation on the scale of FIG. 7 illustrating an operative phase of the construction of FIGS. 7 to 9 when, for example, the device strikes an obstruction while the line is being withdrawn. This view indicates that the device may be tilted and its loose weight portions then flowed within its chamber in such a manner as to cause the device to tilt-off or over an obstruction if required to free it.

FIG. 11 is a vertical view in elevation on the scale of FIG. 7 illustrating a still further embodiment of the invention wherein the parts have an adjustable relation that is controlled by screw threading.

And, FIG. 12 is a vertical section in elevation on the same scale as and of the device of FIG. 11.

DESCRIPTION OF PREFERRED EMBODIMENTS

Figure 1:
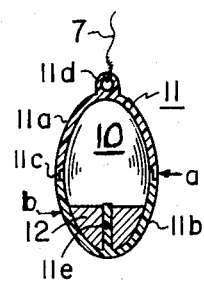
FIG. 1 is a vertical section illustrating a simple form of casting sinker device embodying the invention.
Figure 2:
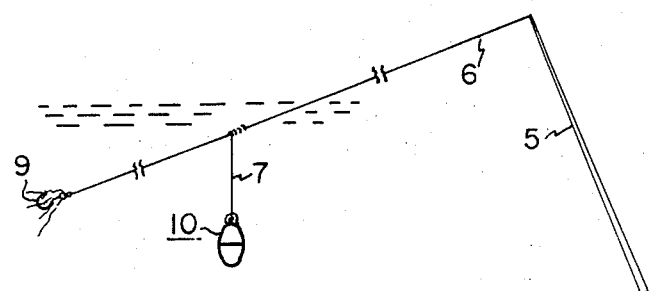
FIG. 2 is a greatly reduced schematic side view in elevation illustrating a typical position of the sinker of FIG. 1 after a fishing line has been cast in a relatively stable or quiescent body of water.
Figure 6:
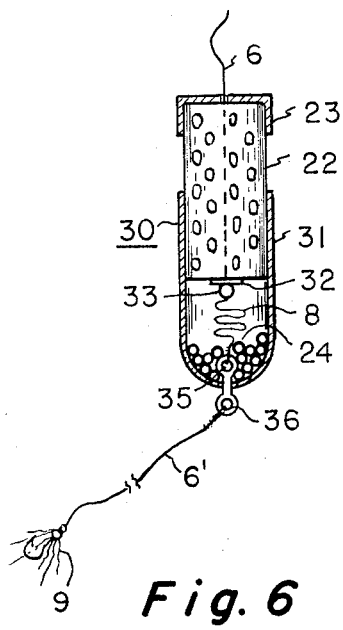
FIG. 6 is a vertical view in elevation of an adjustable device of the invention on the same scale as FIG. 3 and illustrating a slightly modified form of construction in which an upper plug part is connected to a lower eyelet by an extensible string or line.
Figure 6A:
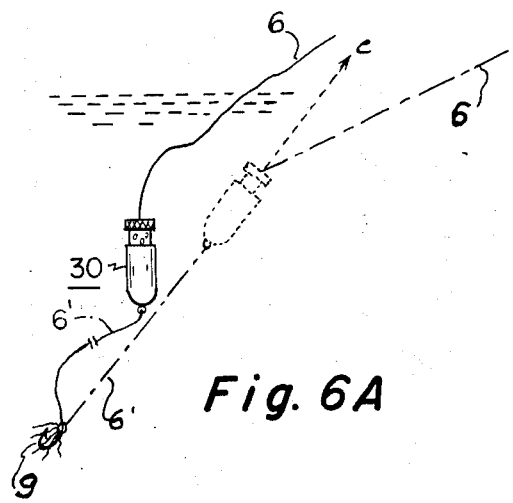
FIG. 6A is a reduced schematic side view in elevation illustrating usage of a sinker device such as shown in FIG. 6. In this figure, the full line portion illustrates a typical position of the device in a relatively quiescent body of water during a fishing operation when little or no pull other than a stabilizing pull is exerted by the pole line. The dot and dash portion illustrates a typical initial positioning of the sinker device when a line has been cast in or when it is being withdrawn from within a body of water.

As illustrated in FIGS. 2 and 6A, a fishing sinker such as 10 or 30 of the present invention may be either directly mounted on a leader or line 6 between a lure or hook 9 and a rod 5 or may be carried on an auxiliary line 7 attached to the main fishing line or leader. In the embodiment of FIG. 1, the sinker 10 is shown in FIG. 1 as provided with a hollow oval body, enclosing wall or shell 11 that may be of a suitable resin material, such as polystyrene. The enclosing wall of the body 11 is shown made up or formed in upper and lower halves 11a and 11b which have a complementary offset tab joint 11c. The joint 11c may be cemented, welded or otherwise secured to provide a fluid sealed-off relation after solidified lead or other form of weight means or ballast 12 has been provided at the lower end thereof. The lower body or wall half 11b has a nubbin or pin 11e that serves as a securing anchor or stake for solidified heavy material, such as lead that provides the weight or ballast 12. The other or upper wall 11a has a connector or eyelet tab 11d to which, for example, an auxiliary line 7 may be attached (see FIG. 2).

In the embodiment of FIG. 1, arrow a indicates its center of buoyancy and arrow b indicates its center of gravity. It will be noted that the parting line between the two halves of the body 11 corresponds to the center of buoyancy a. The body 11 of this embodiment has a smooth, ellipsoid of revolution or spheroid shape. An exemplary specification is represented by a weight of polystyrene of 1.301 grams and ballast of 5.939 grams to give a total weight in air of about 7.24 grams and of .255 of an ounce, when immersed in water; this configuration displaces 4.317 c.c. of water and is therefore buoyed upwardly with a force equal to 4.317 grams for a suspended weight in water of 2.923 grams or .103 of an ounce.

The fluid or air pocket in the upper end of the sinker 10 as used with the weight or ballast 12 at the lower end provides stability while casting, in that the heavier or weighted end will lead the lighter end in flight. When in water, the sinker 10 will assume an upright position (see FIG. 2), for example, at rest near the bottom of the pool or stream to hold the line 6 off the bottom. When the line 6 is being retrieved, using this form of sinker 10, a forwardly inclined angle of approach most favorable for sliding over obstructions in the direction of travel is attained. The sinker 10 also tends to hold the taut line 6 well off the bottom at very slow reeling speeds. By varying the ratio of ballast to displacement or configuration utilizing the principles of the present invention, any casting weight can be developed having a desired effective water buoyancy as attained by the use of an elongated or slender body having an air or lighter-than-water fluid-containing spacing at one end and weighted with heavier than water ballast at the other end. The spacing may be adjusted to enable the sinker to hold the line 6 even higher off the bottom for maximum ease of retrieving it. Sinkers of the invention can be used in shallow as well as deep water.

Figure 3:
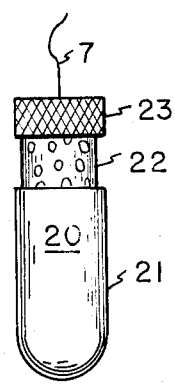
FIG. 3 is a vertical view in elevation on the scale of FIG. 1 illustrating a form of sinker device of the invention that is provided with adjustable plug means.
Figure 4:
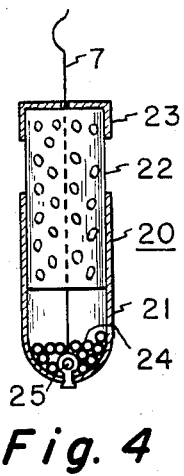
FIG. 4 is a vertical section on the scale as and of the sinker device of FIG. 3 with its parts in the same relative positioning.
Figure 5:
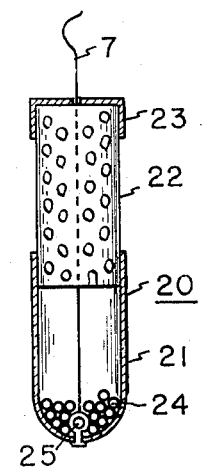
FIG. 5 is a vertical view in elevation on the same scale and of the device of FIGS. 3 and 4 and showing its parts in an outwardly adjusted relation such that its chamber is enlarged.

In FIGS. 3, 4 and 5, a form of sinker 20 is shown having an elongated, hollow, tube-like container or main body part 21, a slide-fitting cork or solid closure plug part 22 that fits with an upper open end or mouth portion of the body part 21 to seal it off, a serrated cap or end closure 23 for the plug part, and loose, shot-like weight portions 24 within its closed-off spacing. In this embodiment, the auxiliary line 7 instead of being connected to the outside of the sinker 20 is connected to the inside of the body 21 which, as shown, has a round, closed bottom end wall and an upper, open mouth portion. An upwardly extending, inside, bottom connector eyelet or lug 25 serves as an anchor for the auxiliary line 7.

In the embodiment of FIG. 6, sinker unit 30 has parts generally the same as those of FIG. 3, except that a two-part eyelet 35, 36 is provided. Inner eyelet part 35 projects from the inside of the lower rounded end of its cylindrical body 31, and outer eyelet part 36 projects from the outside in an opposite position with respect to the eyelet 35. In this embodiment, line 6 or 7 may be connected to the inner eyelet 35 through the agency of an inner length of the pole line or a so-called control portion 8 that has a sufficient length to limit the maximum line-pulled outward positioning of the plug 22 (see FIG. 5), and to provide a loose loop when the plug is pushed inwardly or slidably telescoped within the body part 31 to decrease the spacing therein. The control line portion 8 is fixed against outward movement within the cork 22 by a washer 32 and a split shot element 33, with the result that a sufficient amount of line 8 must be provided to permit adjusting movement of the cork 22 between its innermost positioning and its outermost positioning within the cylinder wall or body 31. Relative pulling movement between main line part 6 and lure-connected line part 6' or manual force applied to the cap 23 may be employed to move the plug 22 outwardly and increase the fluid or air space within the sinker 30. See, for example, FIGS. 8 and 9. As shown, the sinker 30 may be placed between two parts 6 and 6' of the main line to which hook or lure 9 is attached.

In FIG. 6A, the full lines represent the assembly after it has been cast and has reached a stable condition. The dot and dash lines represent it either when a pulling out force is being exerted by the fisherman or when the assembly has been cast by the fisherman into the water. The direction of ascent and descent of the sinker is represented by the dotted line c.

In the embodiment of FIGS. 7 to 9, a sinker 40 is provided that also has an elongated hollow container, cup or body part 41, but is provided with an upper, telescoping, inner cup or sleeve-like plug part 42 that is adapted to slide within the body part 41. A knurled closure cap 43 is welded, soldered or cemented to close-off the upper end of the plug or upper sleeve part 42. A sealing grommet 44 carries the line 6 or 7 which is limited in its outer movement by a split lead shot element 33 to again provide an enclosed, loose, captive line portion 8. If, as shown in FIGS. 4, 6, 8 and 12, loose pellets or shot pieces are used to provide the ballast 24, it will be apparent that they will be free to move within the hollow spacing of the enclosing body of the sinker 40 (see FIG. 10) to change its center of gravity and facilitate tilting movement over an obstruction, such as a rock A. The amount of weight represented by the loose pieces 24 may be adjusted by the fisherman at the site to meet specific requirements. To facilitate fluid-sealed-off sliding movement between the parts 41 and 42, the part 41 may have an annular groove, recess or tongue portion 41a to serve as a mounting for a resilient O-ring 45 that engages the outer surface of the plug 42. The O-ring 45 provides an effective fluid seal across the slide joint against entry of water into the air or lighter-than-water fluid space defined by the parts 41 and 42.

Sinker 50 of FIGS. 11 and 12 has a bottom or hollow body part 51 of elongated cylindrical shape whose lower portion 51b is of a smaller diameter and is provided with rather coarse female threading therealong. The body part 51 also has an upper open end portion 51a of larger cylindrical diameter provided with an offset, annular, recess or groove portion 51c for receiving and retaining a sealing resilient O-ring or washer 55 therein. Upper cylindrical plug part 52 has an uppermost enlarged portion 52a of larger diameter and a lowermost cylindrical portion 52b of reduced diameter with outer, coarse, male threading. The upper portion 52b carries a serrated closure cap 53 from which extends an eyelet 54 that may, for example, be connected to auxiliary line 7 or have main line 6 extended therethrough. In this embodiment, the air space defined or provided by the two parts 51 and 52 may be adjusted by relative screwing movement therebetween. Cooperation between offset shoulders 51d and 52d as well as the end cap 53 and the upper edge of the portion 51a of the two body parts 51 and 52 may be employed to limit the maximum inward telescoping of the upper plug part 52 within the lower body part 51. In this embodiment as well as in the embodiment of FIGS. 4, 6 and 8, loose shot or lead weight portions 24 or, if desired, a cast-in or secured weight (see FIG. 1) may be placed within the lowermost end of the lowermost part 51. The ballast or weight 24, of course, provides the mass necessary or needed for casting the lure or hook to a desired fishing pool or area.

In the embodiment of FIGS. 3, 4 and 5 and in the embodiment of FIGS. 11 and 12, the size or extent of the adjusted air space as controlled by the exact position of the cork 22 or upper sleeve 52 will be retained when set by the fisherman. However, in the embodiments of FIGS. 6, 7, 8 and 9, the "set" positioning, if not an outermost positioning, may be changed in the water to increase the air space area and thus, the buoyancy of the sinker when the line 6 is being pulled-in by tension applied by a rod 5 and its reel (not shown). If, for example, the sinker strikes an obstruction in the water, its plug may be pulled out further to additionally increase its buoyancy and facilitate its bypassing such obstruction when further pull is exerted on the line 6. Any of the embodiments may be used with either a stable or a variable weight. In the embodiment of FIGS. 7 to 9, engagement of the upper edge of the body part 41 with the backwardly extending edge of the knurled cap 43 limits the maximum inward or collapsing movement of the plug part 42. A sinker constructed in accordance with the invention has the further advantage, when cast or thrown, of tending to enter the water in a forwardly advancing angular relation (see the dot and dash line of FIG. 6A) to thus increase its distance capability. Also, in the embodiments of FIGS. 6 to 9, the inherent construction is such, by reason of the inner positioning of the limit stop provided by the element 33, that when the sinker is out of the water, a fisherman may pull the upper and lower parts 31 and 32 or 41 and 42 fully apart to insert or remove weight elements 24. The closely fitted through-extending relation of the fishing line 6 centrally within the cork upper closure part 22 of FIG. 6 and the use of the grommet 44 in the embodiment of FIGS. 7 to 10, enables relative movement of the fishing line 6 with respect to the upper closure part 22 or 42 while also enabling a fluid sealed-off relation between the upper closure part and the line.

A sinker device constructed in accordance with the invention has a weight that is sufficient for casting the lure or baited-hook a desired distance, and has a sealed-off fluid or air space that counterbuoys at least a part of the casting weight after it enters the water to thus make the sinker suitably light, vertical in position attitude and stable in its behavior. It will be apparent from the disclosure that the device may be constructed to provide variations in its casting weight in air, for variations in its counterbuoyancy, and for a change in its center of gravity within water. As an optimum, the device will have an appreciable part of its weight counterbuoyed in water. It essentially has an elongated axis or a greater lengthwise than crosswise dimension and will normally position itself vertically while at rest within water. Its movement through both air and water tends to be controlled by its elongated axis.

At moderate to fast reeling speeds, a sinker constructed in accordance with the invention, does not slide over the bottom or bed of a stream but lifts therefrom and takes an angular upward path to the surface of the water, where it tends to move along the surface or aquaplane for the remainder of its recovery. This behavior while being recovered is due to several features of the invention cooperating to produce the desired effect. The elongated form with heavier-than-water ballast at one end and integral ligher-than-water construction at its other end causes it to establish a stable upright position in a body of water. The ballast provided is of a sufficient weight to submerge the device which then assumes a position of heavy end down and light end up. It resists being turned over on its side and in response to fast or normal reeling speeds will incline resistively but only partly toward the direction of pull which, as shown in FIG. 6A, is somewhat of a horizontal outward pull while the movement of the device is more of a sharp vertical angular movement. During the out-pull, the resistance of the inclined wall of water exerts a resultant upward force on the lower portion of the sinker which further tends to cause it to move endwise along a path of least resistance in a relatively steep or abrupt ascending movement to the water surface.

I claim:

1. In a fishing line sinker that has requisite casting throw characteristics in the atmosphere and an effective buoyancy in water, that may be readily taken apart by a fisherman when out of the water and that may be pull-adjusted by a fishing line without danger of separation while in use in the water, an improved construction which comprises, an elongated two-part floatable body, said body having a hollow cylindrical lower part provided with a closed-off outwardly convexly rounded lower end wall and an upper open mouth portion, said body also having an upper closure part provided with a closed-off upper end wall and with a cylindrical lower end portion, the cylindrical lower end portion having an inwardly and outwardly telescopic slidable relation with the upper open mouth portion of said lower part to provide a variable air space therewithin, a fishing line extending centrally through the closed-off upper end wall of said upper part and within said body, the line within said body being centrally secured at its lower end to the inside of the lower end wall of said lower part and having an upper portion extending centrally downwardly within said body from said upper closure part, the line within said body having a length therewithin such that it has a loose relation between said upper and lower body parts when said upper part is in an innermost position with respect to said lower part, limit stop means on the upper portion of said line within said body and cooperating with the upper end wall of said upper closure part for solely limiting maximum outward movement of said upper part with respect to said lower part when the sinker is in the water as effected by an upward pull on said line to a taut length within said body and for permitting said parts when the sinker is out of the water to be manually pulled-apart by separating force applied directly thereto, said upper part having a fluid sealed-off slidable positioning with respect to said lower part, and weight means carried within said lower part inside the lower end wall thereof.

2. In a sinker as defined in claim 1, sealing means positioned centrally of the upper closed-off end wall of said upper closure part, and said line extending in a sealed-off relation through said means into said body.

3. In a sinker as defined in claim 2, said sealing means being a grommet, and said limit stop means being adapted to cooperate with said sealing means for limiting the maximum outward movement of said upper closure part as effected by an upward pull on the fishing line.

4. In a sinker as defined in claim 1, said upper closure part being of hollow cylindrical construction and having a downwardly open mouth portion that slidably fits within the upper open mouth portion of said lower part.

5. In a sinker as defined in claim 1, the upper open mouth portion of said lower part and of the upper end wall of said upper closure part have transversely outwardly projecting portions that are adapted to engage when said upper closure part has been slid inwardly with respect to said lower part for limiting a maximum inward positioning of said upper closure part and for defining the minimize size of the air space within said body.

6. In a sinker as defined in claim 1, said weight means comprising loose weight elements carried within said lower part and adapted to rest on the inside of the lower end wall thereof.

7. In a sinker as defined in claim 1, a sealing grommet positioned centrally of the upper closed-off end wall of said upper part, said line extending centrally through the upper end wall in a sealed relation with respect thereto through the agency of said grommet, said limit stop means being a split element secured on the upper portion of said line within said body and cooperating with said grommet for limiting the maximum upward pull of said line from within said body.

* * * * *